(12) United States Patent
Wang (10) Patent No.: US 11,059,454 B1
(45) Date of Patent: Jul. 13, 2021

(54) SMART SENSOR FOR VEHICLE SECURITY SYSTEM

(71) Applicant: Reng-Shan Wang, Taipei (TW)

(72) Inventor: Reng-Shan Wang, Taipei (TW)

(*) Notice: Subject to any disclaimer, the term of this patent is extended or adjusted under 35 U.S.C. 154(b) by 0 days.

(21) Appl. No.: 16/907,484

(22) Filed: Jun. 22, 2020

Related U.S. Application Data (60) Provisional application No. 63/012,263, filed on Apr. 20, 2020.

(51) Int. Cl.
  *B60R 25/20* (2013.01)

(52) U.S. Cl.
  CPC .................... *B60R 25/20* (2013.01)

(58) Field of Classification Search
  CPC ..... B60R 25/20; B60R 25/102; B60R 25/209; B60R 25/24; B60R 2325/10; B60R 25/104; B60R 25/2009; B60R 25/00; B60R 25/10; B60R 2325/30; G07C 2209/62; E05B 77/00; E05B 85/00
  See application file for complete search history.

(56) References Cited

U.S. PATENT DOCUMENTS

| | | | | |
|---|---|---|---|---|
| 5,850,173 | A * | 12/1998 | DiCroce | B60R 25/1001 340/426.25 |
| 6,956,467 | B1 * | 10/2005 | Mercado, Jr. | B60R 25/042 340/425.5 |
| 2005/0253691 | A1 * | 11/2005 | Parnaby | B60R 25/1003 340/426.11 |
| 2006/0017550 | A1 * | 1/2006 | Yoshida | B60R 25/24 340/426.11 |
| 2010/0048244 | A1 * | 2/2010 | Goren | B60R 25/24 340/426.13 |

* cited by examiner

*Primary Examiner* — Sisay Yacob
(74) *Attorney, Agent, or Firm* — Chih Feng Yeh; Huntington IP Consulting Co., Ltd.

(57) ABSTRACT

A smart sensor module for providing protection to vehicles having central lock system, which has only five connecting wires coupling the smart sensor module to the vehicle acting as security system with the remote controller come with the vehicle from the original manufacture, there are only two buttons of the remote controller, with which the smart sensor module can automatically perform ARM/DISARM function for the vehicle in response to the user's action respectively to Lock/Unlock the doors. The smart sensor module does not utilize any device for wireless transmission.

16 Claims, 8 Drawing Sheets

SMART SENSOR FOR VEHICLE SECURITY SYSTEM

CROSS-REFERENCE TO RELATED APPLICATIONS

The present application is based on and claims priority from U.S. Provisional Application Ser. No. 63/012,263 filed Apr. 20, 2020, the disclosure of which is hereby incorporated in reference in its' entirety.

BACKGROUND

Technical Field

This disclosure of the present invention concerns auto security systems designed to deter or prevent thefts of a vehicle, particularly relates to a smart sensing system which can be easily and efficiently installed with least labor.

Description of Related Art

Around a decade ago, there has been an estimate in the U.S. police department that the attempted or successful forced entry to automobiles are at the rate of 1 entry every 20 seconds, or more than 1.5 million reported attempted or actual automobile thefts in one year. In an attempt to reduce break-in to and theft of and from automobiles, many new cars are fitted with alarm systems, and older cars without these systems are having alarm systems added, and some cars with systems already installed are the having existing systems upgraded or improved by adding new features.

It is believed that many drivers have a common experience that they—no matter the elderly or the young—left and went away from their vehicle, but cannot remember if they had press the "LOCK" button to lock the doors of the vehicle. For those drivers who often forget whether he/she left the vehicle unlocked, there are two approaches to solve this problem. The first approach is to go back to the vehicle immediately and utilize the remote controller to activate the central locking system and lock all the doors of the vehicle. It makes the driver feel safer, but somehow annoying.

The second approach is to install a security system in the vehicle. The traditional security system is programed to automatically lock the vehicle if it sensed that the driver went away and left the vehicle unlocked, thus the security system can be active by some sensors, and then the vehicle can be armed, and all doors of the vehicle being automatically locked.

Traditional security system is usually in the state "always on", in other words, as long as the vehicle battery is connected, and a door was opened, then the shock may trigger a sensor, such as shock sensor, then the system is activated and an output (e.g. siren or horn and/or parking light and/or headlight flashing) is activated to draw the attention of the people nearby.

In the present time, there are many available automobile security systems in the market. As to the related art utilized in the vehicle electronics already in the market, a typical automobile security system, please refer to FIG. 1, the microcontroller unit 18 receives the incoming signal from receiver 16 and compares or verifies the coded signal with a code stored in a memory 19, which may be an $E.^2$PROM (not shown) in the microcontroller unit 18. If the code is verified, then an output signal is provided on an output terminal and lead 20 of the microcontroller. This output signal is typically a pulse of sufficient duration and amplitude to operate a relay 22 which is shown in the drawings between the microcontroller unit 18 and a first door or driver's door unlock control 30*b*. The relay 22 is shown external to the microcontroller unit, although it may actually locate on the same circuit board as the microcontroller unit circuit board, or part of the microcontroller unit 18.

In addition, a typical security system includes inputs or sensors, (e.g. to sense if a door is open or closed) and outputs, (e.g. to a siren or lighting devices). The security system is usually always on, and the automobile battery is connected to the micro control unit, although some units may include backup batteries. The security system is either armed, (i.e. ready to sense an input sensor and activate an output in response thereto), or disarmed, (i.e., not to be activated by a sensor). When the system is armed, and the sensor is activated, (e.g. a door is opened), then a sensor designed to sense this situation is triggered, and the security system will send an output-to-alarm signal (e.g. siren) is sent to make the SIREN or HORN honk.

Figure 1:
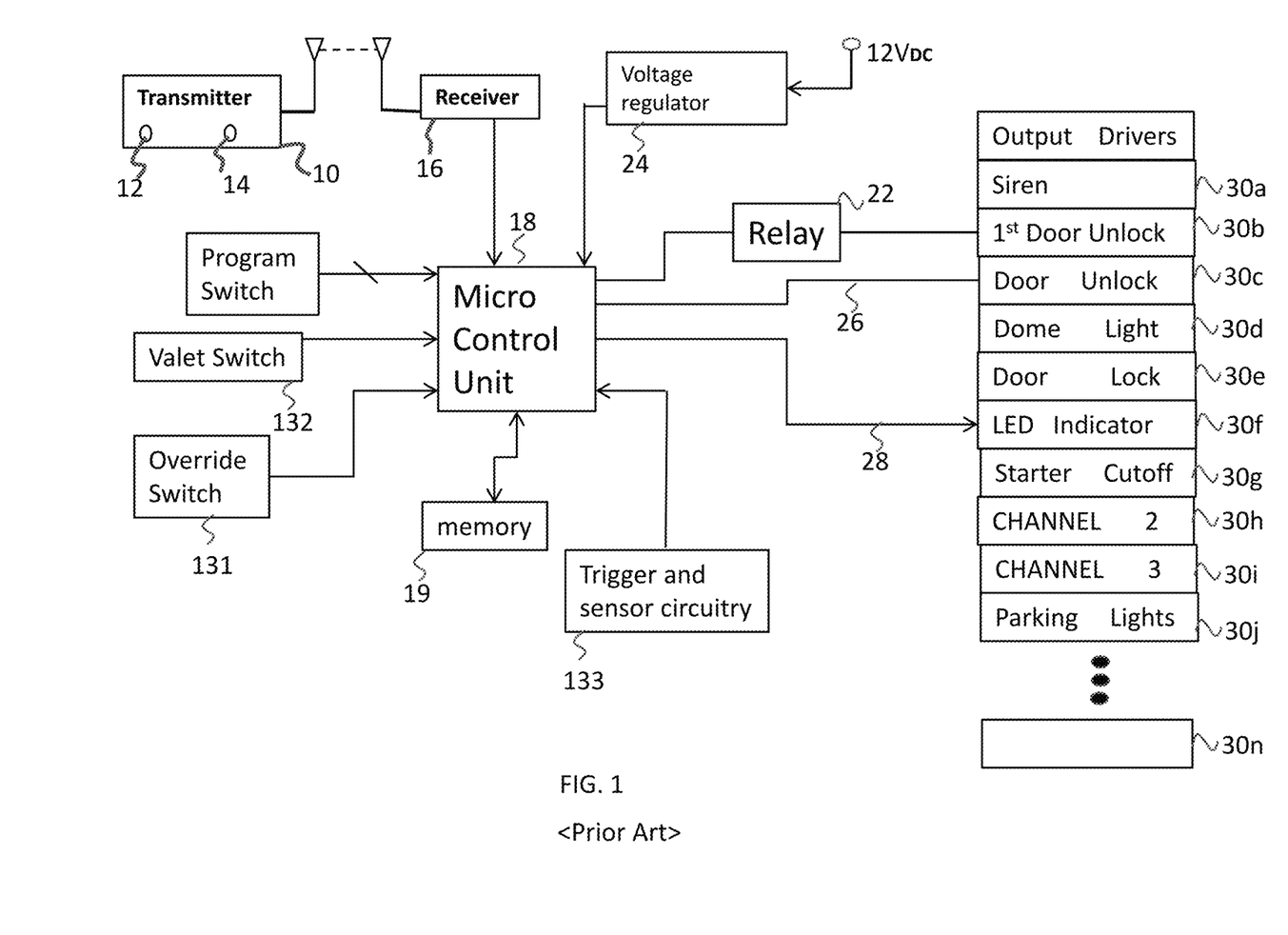
FIG. 1 shows the functional diagram of a traditional vehicle security system with individual remote controller, receiver and antenna the present invention.

As shown in FIG. 1, the override switch 131 provides an input to the micro control unit 18. The switch is typically a depress switch which would send a single pulse to the micro control unit 18, although any convenient or conventional switch may be used. The switch is physically located within the car, and is usually placed at a position known only to the driver. This is usual for the location of the override switch, as is the location for a valet switch 132. The sensing of the ignition being on, comes from the plurality of input circuits which are shown in FIG. 1 as trigger and sensor circuitry 133.

When it comes to anti-theft protection, to install an security system in a vehicle is a must for the driver to feel safer, however, please refer to FIG. 1, as everyone can tell, there are many connecting wires must be arranged to connect to each corresponding electric elements of the vehicle. The afore-mentioned corresponding electronic elements may include siren/horn, parking lights/headlights, ignition system, door unlock, voltage regulator, trigger and sensor circuitry, memory, LED indicator, receiver . . . etc. A vehicle security system includes two portions, one is the security module to receive signal from the sensors and to output signal to each corresponding electric element of the vehicle, the other is the connector wiring set to provide electric coupling between the input/output terminals of the security module and each corresponding electric element of the vehicle.

Figure 2A:
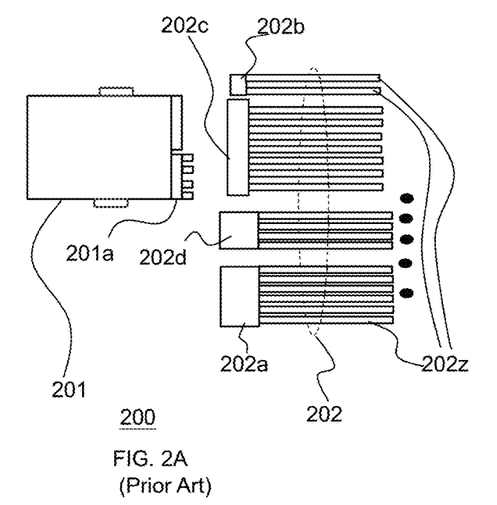
FIG. 2A to 2F show the physical appearance of a several brands of traditional vehicle security system in the market, which illustrate there are two parts in each security system—security module and wiring set.

There are many different brands of security systems in the market, however, the basic configuration is the same. To illustrate the physical appearance of vehicle security system, please refer to FIG. 2A to FIG. 2F, the security system 200 in FIG. 2A is the brand of Black Widow, it includes a security module 201 and a wiring set 202, the connector terminal 201*a* of security module 201 is designed to connect to the connector head 202*a*, 202*b*, 202*c* and 202*d* of the wiring set 202, and the connecting end 202*z*, which is at the other end of each wire adopted in each connector head, is designed to physically connected to each corresponding electric device or sensor of the vehicle. As illustrated in FIG. 2A, the wiring set 202 of the security system 200 includes 4 connector heads with many connecting ends, in this case, the number of connecting end is 15. In other words, the technician has to connect 15 connecting ends to the wire of each corresponding electric device or sensor in the vehicle.

Figure 2B:
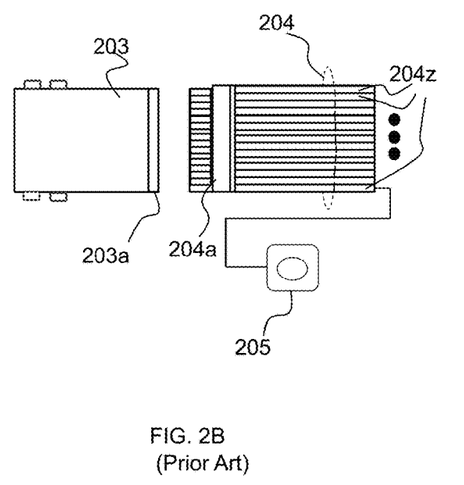

Please refer to FIG. 2B, it is the physical appearance of vehicle security system of the brand COBRA, which includes a security module 203 and a wiring set 204, the connector terminal 203a of security module 203 is designed to connect to the connector head 204a of the wiring set 204, and the connecting end 204z, which is at the other end of each wire adopted in each connector, is designed to physically connect to the wire of each corresponding electric device or sensor of the vehicle. As illustrated in FIG. 2B, the wiring set 204 of the security system 205 includes one connector with many connecting ends 204z, in this case, the number is 20. In other words, the technician has to connect 20 connecting ends 204z to the wire of corresponding electric device or sensor. Therefore, the technician in the garage or vehicle manufacturer has to deal with this issue-efficiently and correctly connect each connecting ends to corresponding electric element of the vehicle.

Figure 2C:
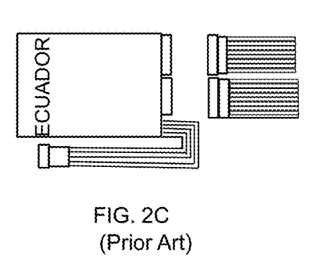
Figure 2D:
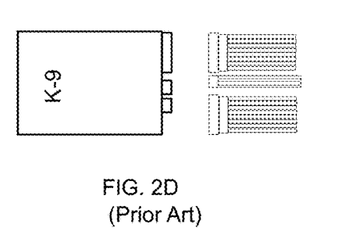
Figure 2E:
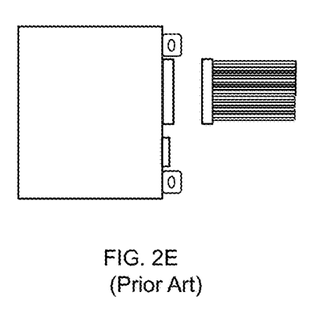
Figure 2F:
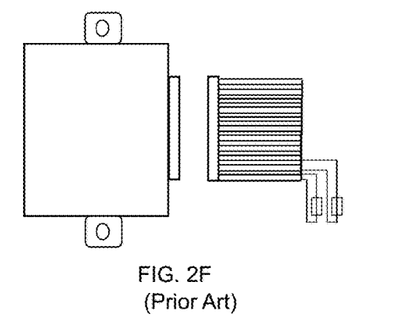

The physical appearance of some other brands of vehicle security system are respectively illustrated in FIG. 2C to FIG. 2F, the brand Chevrolet with label ECUADOR is shown in FIG. 2C, which is composed of a security module and a wiring set having 17 connecting ends. The brand OMEGA with label K-9 is shown in FIG. 2D, which is composed of a security module and a wiring set having 12 connecting ends. The brand VIPER is shown in FIG. 2E, which is composed of a security module and a wiring set having 12 connecting ends. The brand Code Alarm is shown in FIG. 2F, which is composed of a security module and a wiring set having 13 connecting ends.

According to the prior paragraphs mentioned above, when installing the vehicle alarm system, the technician will have to connect each connecting ends to the wire of each corresponding electric device or sensor, and the number is around 12 to 20, therefore, it is a considerable workload which pose a burden on the technician and result in low production capability for the vehicle manufacture. Thus, if any invention can resolve this issue, it will be helpful to raise the productivity.

SUMMARY

A smart sensor module having an arm mode and a disarm mode respectively settable in response to the user's action to press down a LOCK button and the other press down on an UNLOCK button of a remote controller paired to a vehicle from the original manufacturer. The vehicle includes a battery, a connector wire set, a fuse box, an SIREN/HORN and an ignition switch having an ON state, an ACC state and an OFF state. The fuse box have four fuses respectively coupled, in one direction, to four devices of the vehicle, and coupled to the connector terminal of the smart sensor module in the other direction. Wherein, the first fuse of the fuse box is electrically coupled to the positive end of an exterior lighting device, such as parking light, of the vehicle, the smart sensor module includes the parts as disclosed below.

A connector terminal adapted to provide five conductive paths from the fuse box and the audio device of the vehicle into each corresponding devices of the smart sensor module, according to the present invention, the number of conductive paths electrically coupling the smart sensor module to the vehicle does not exceed five. This is why the present invention can provide a smart security system which saving tons of technician's effort to install the system to a vehicle.

A power supply regulator adapted to regulate and feed power to each devices of the smart sensor module, the power supply regulator is electrically coupled through the connector terminal to the fuse box. The input interface adapted to convert and transmit voltage level on the ignition switch and the positive end of the exterior lighting device to a range within the rated input voltage of the element electrically coupled to the input interface.

The microprocessor adapted to arm the smart sensor module in response to the user's action to press down the LOCK button, which results in a number of voltage-switching times on the positive end of the exterior lighting device, such as parking light or head light, equals to a LOCK value stored in the microprocessor. The microprocessor responsively sets the smart sensor module as DISAMR mode when the user's action to press down the UNLOCK button, which results in a number of voltage-switching times on the positive end of the exterior lighting device, such as parking light or head light, equals to an UNLOCK value stored in the microprocessor, wherein, there are also a protection process and a system programming process stored in the microprocessor. The system programming process provides the user a mechanism to reset the LOCK value and the UNLOCK value, which is utilized to determine when to ARM or DISARM the smart sensor module, and then, to or not to perform the perform the system protection process.

The shock sensor adapted to quantize shock wave resulted from an impact occurred to the vehicle and to feed a first activating signal to the microprocessor when the quantized value exceeds an adjustable preset value, then microprocessor send a signal to sound the SIREN/NORM in response to the first activating signal.

The output interface adapted to sound the SIREN/HORN of the vehicle in response to the output signal from the microprocessor. When the smart sensor module has been set as arm mode, the microprocessor performs the protection process to detect whether the voltage level on the positive end of the ignition switch in the ACC state is switched or the shock sensor is triggered by any impact exceeding the adjustable preset value, if at least one of the aforementioned sustained, i.e., any result of the detection by the protection process is positive, then the protection process in the microprocessor's output signal sounds the SIREN/HORN for a preset time period through the fifth conductive paths of the connector terminal, wherein the other four conductive paths of the connector terminal are coupled to the four fuses of the fuse box.

The smart sensor module further includes a push switch for activating the system programming process stored in the microprocessor, when the vehicle comes with a default arm number and a default disarm number, said default arm number being different from said lock value originally stored in said microprocessor, said default disarm number being different from said unlock value originally stored in said microprocessor.

The smart sensor module includes a push switch, which is used to activate the system programming process stored in the microprocessor. The system programming process is useful when the vehicle comes with a default arm number and a default disarm number respectively different from the lock value and the unlock value originally stored in the microprocessor of the smart sensor module. The system programming process is designed to store the default arm number and the default disarm number into the microprocessor to replace the lock value and the unlock value respectively. The smart sensor module includes a light emitted diode for indicating whether the smart sensor module is in the arm mode, disarm mode, or system programming process being performing by the microprocessor.

DETAILED DESCRIPTION

The present invention proposed a smart sensor instead of traditional alarm system to reduce the workload when installing an alarm system, according to the design of the present invention, the total number of input and output wires of the smart sensor is not more than five, in other words, the technician only has to install less than or equal to 5 connecting ends to corresponding electric element of the vehicle, and he has complete the installment of a smart alarm system, thus the present invention effectively reduced the workload of the technician. Nowadays, for all the cars in the automobiles market, the Remote Central Door Locking System is one of the standard equipment, i.e., every car out of factory will be equipped with a Remote Central Door Locking System, and it is where the preferred embodiment of the present invention may be deployed.

Some preferred embodiments of the disclosure of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

The present invention captured some fundamental features of security system accompanied with widely-used common operational visual characteristics of vehicle performing locking/unlocking action, in addition, the present invention introduced some newly designed system, thus the system according to the present invention can greatly reduce the necessity to send/receive electric signals to/from each corresponding electric elements. Therefore, the number of connecting wires in the system according to the present invention is greatly reduced, and the technician can easily install the smart alarm system.

Figure 3A:
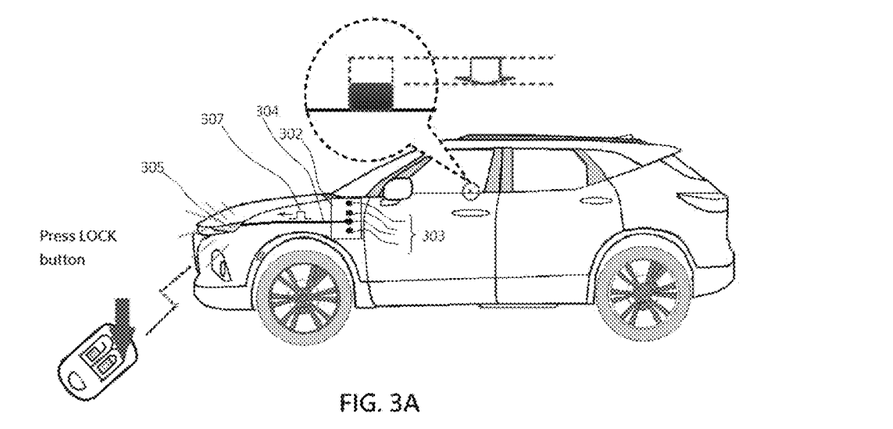
FIG. 3A shows the reaction of a vehicle equipped with central locking system but not yet installed any alarm system, when the LOCK button on the remote controller from the original manufacturer was pressed-down.
Figure 3B:
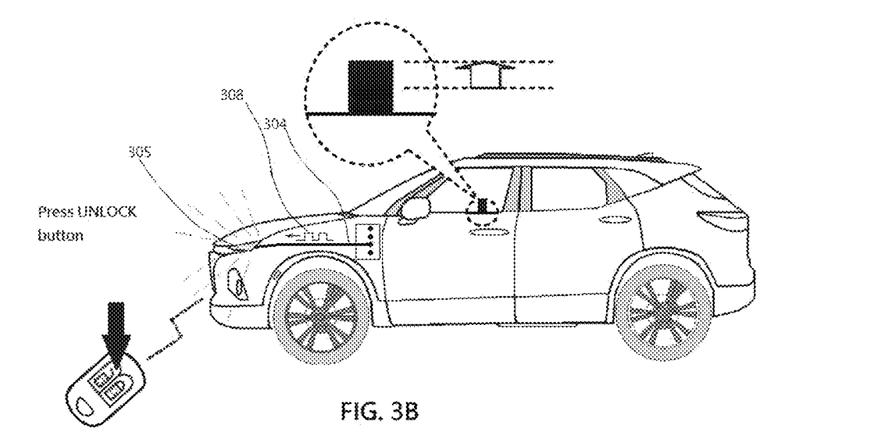
FIG. 3B shows the reaction of a vehicle equipped with central locking system but not yet installed any alarm system, when the UNLOCK button on the remote controller paired to the vehicle from the original manufacturer was pressed.

A vehicle equipped with central lock system always comes with a remote controller paired to the vehicle by the original manufacture of the vehicle, prior to the installation of any vehicle security system, FIG. 3A and FIG. 3B illustrate how the vehicle reacts when the driver use the remote controller to LOCK/UNLOCK the vehicle responsively, it is noticed that there are only two buttons LOCK/UNLOCK on the surface of the remote controller, because almost all remote controller comes with the vehicle from the original manufacturer only has these two button. FIG. 3A illustrates when the driver leaves the vehicle, closes the door, and then presses-down the LOCK button on the vehicle's remote controller, then the central locking system of the vehicle will responsively lock the doors. Simultaneously, the fuse box 302 receive a voltage switching on one of the fuse 303 electrically coupled through the connecting wire 304 to the positive terminal of the parking light 305. Because there is a voltage switching, i.e., voltage pulse 307, applied to the parking light 305, it flashes once in response to the driver's action to press-down the LOCK button on the remote controller. The smart sensor according to the present disclosure utilizes this mechanism widely adopted in vehicle industries to spare the necessity for additional remote controller in a smart security system. In the car's original remote control system, when the user press-down the LOCK button, then in response, a voltage level switching 307 transmitted through the original circuitry to the exterior lighting device, such as parking light 305, and the wire, shown in FIG. 4A, from the present disclosure electrically coupled to the parking light 305 capture the voltage switching, and the apparatus according to the present disclosure utilize it as an criteria to start the ARM mode and function as a smart security system. It is obvious that when the LOCK button is pressed down, there will be a voltage switching transmitted through the connecting wire to the parking light 305 and make it flash once, this may be referred as a flash pattern of the parking light. In addition, the number of flashes of the parking light is equal to the number of the voltage level switching times on the connecting wires 304 coupled to the parking light 305. The headlight and parking light or direction light, as widely recognized, are located at the exterior surface of the body of the vehicle, in general, can be referred as exterior lighting devices.

Figure 4A:
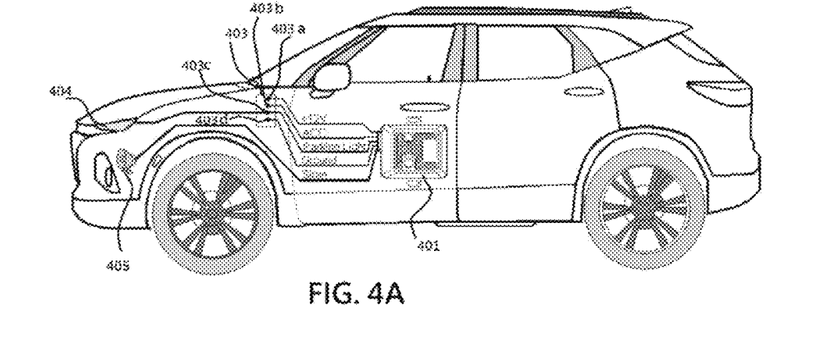
FIG. 4A shows the wiring diagram of the smart alarm system according to one embodiment of the present invention, according to which, the smart sensor module is connected to the siren, the fuse box and headlight of the vehicle.

In FIG. 3B the UNLOCK button of the original remote controller is pressed down, the other voltage pulse 308, which is generated by the central locking system of the original mechanism, was transmitted to the parking light 305 and make it flash twice. This phenomenon mentioned above is used as an indication that the car's door has been unlocked. At this moment, the voltage on the connecting wire 304 electrically coupled to the parking light 305 varies in response to the press-down on the UNLOCK button, and the variation in voltage level on the connecting wire coupled to the parking light is detected by the apparatus according to the present disclosure as shown in FIG. 4A for wiring diagram and FIG. 5 for functional block diagram of the embodiment of the present patent application. As shown in FIG. 3B, there is a voltage switching, i.e., voltage pulse 308, applied to the parking light 305, it flashes twice in response to the driver's action to press-down the UNLOCK button on the remote controller. The smart sensor according to the present disclosure utilizes this mechanism widely adopted in traditional vehicle industries to spare the necessity for an additional remote controller in a smart security system. In the car's original remote control system, when the user press-down the UNLOCK button, in response, a voltage switching 308 transmits through the original circuitry to the exterior lighting device, such as parking light 305, and the wire, shown in FIG. 4A, from the present disclosure electrically coupled to the parking light 305 capture the voltage switching, and the apparatus according to the present disclosure utilize it as an criteria to start the DISARM mode of a smart security system. It is obvious that when the UNLOCK button is pressed down, there will be an voltage switching transmitted through the connecting wire to the parking light 305 and make it flash twice, this may be named as the other flash pattern, which is utilized in the present disclosure to determine whether the smart sensor module should be set as DISARM mode.

One technical feature of the smart sensor module according to the present disclosure is detect and record how many times dose the parking light flash, i.e., flash pattern, accordingly, determine whether to activate protection of the vehicle or to deactivate protection of the vehicle. In other words, the smart sensor module according to the patent application to the present invention can determine whether to arm the smart alarm system or to disarm the smart alarm system without the necessity to directly receive a signal from a new receiver for receiving wireless signal for an additional wireless controller which is often necessary in a traditional alarm system. From the prior two paragraphs, it is clear that the present invention can directly detect the LOCK/UNLOCK action of the vehicle and responsively ARM/DISARM the smart alarm system without a specific designed wireless controller.

Please refer to FIG. 4A, it shows how the wiring diagram according to which the smart alarm system 401 according to one embodiment of the present invention is installed in a vehicle, in which four connecting wires of the smart alarm system are connected to four fuses (fuses 403a to 403d) of the fuse box 403, which can be easily found in each vehicle nowadays. Wherein, one of the four connecting wires is connected to the fuse 403c, and then connects to the parking light 404. In addition, the fifth connecting wire is connected to the audio device, such as a siren 405, of the vehicle.

Figure 4B:
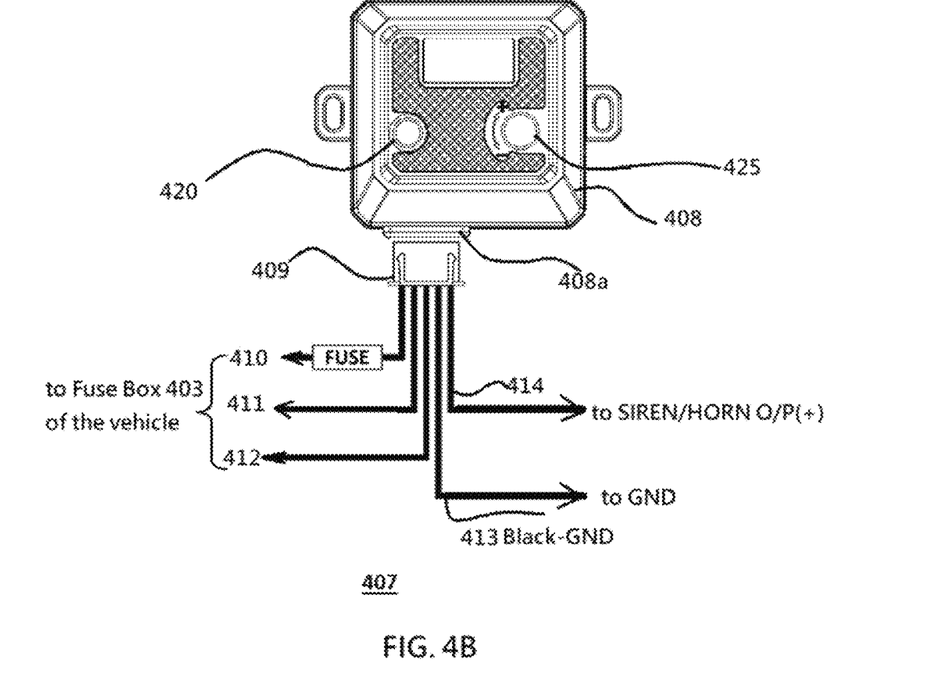
FIG. 4B shows the physical appearance of the smart sensor module and the wiring set according to one aspect of the embodiment of the present invention.

To further describe the detail of the smart sensor according to one embodiment of the present invention, please refer to FIG. 4B, the smart alarm system 407 includes a smart sensor module 408 and a connector wire set 409 which is designed to electrically coupled to the connector terminal 408a of the smart sensor module 408. The connector wire set 409 include a wire 410 connected to a fuse and also electrically coupled to the fuse box 403 of the vehicle, in addition, the wire 411 is electrically coupled to the parking light 404, and the wire 412 is an accessory input ACC I/P(+), which, at the time when the key is inserted and turned to the "ACC" position, provides power to the vehicle's electrical accessories, such as the interior lights, radio and center console but not Air Conditioner. When the key is turned to the ON position, except for the starting motor, all other electrical devices are turned on. When the key is turned to the LOCK (OFF) position, except for the security devices and interior light, all other electrical devices are turned off The ignition switch is one of the most important electronic components that is commonly found on many road going cars and trucks, the person who want to start the car must make the ignition switch to form a closed circuit to provide electric power to ignite the engine and start the vehicle. It is usually located on the steering column, just behind the ignition lock cylinder. The two work together to power on and start the vehicle. The ignition switch has several positions that power on the vehicle's different systems as the key is turned. Most ignition switches will activate the electrical accessories on the first position, power on the fuel and ignition systems on the second position, and crank the engine on the third. The previous paragraph has described the four positions in a traditional key ignition system, in addition, the keyless ignition vehicles are getting more popular, and it also has the four positions in same sequence. Before the vehicle being ignited, the ignition switch must be turned passing the first position, in other words, the wire 412 will be switched to a different voltage level, mostly a higher voltage level, which is ordinary +12 volt.

Figure 4C:
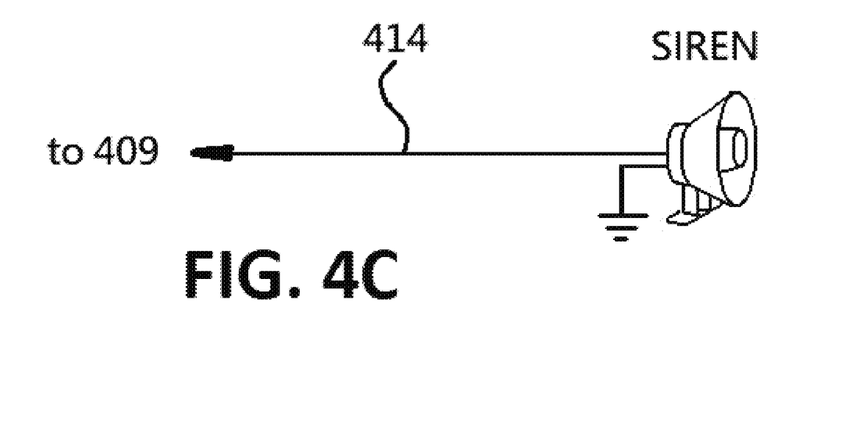
FIG. 4C shows a part of the smart alarm system, in which, a siren is utilized and connected to the other part of the smart alarm system according to one aspect of the embodiment of the present invention.
Figure 4D:
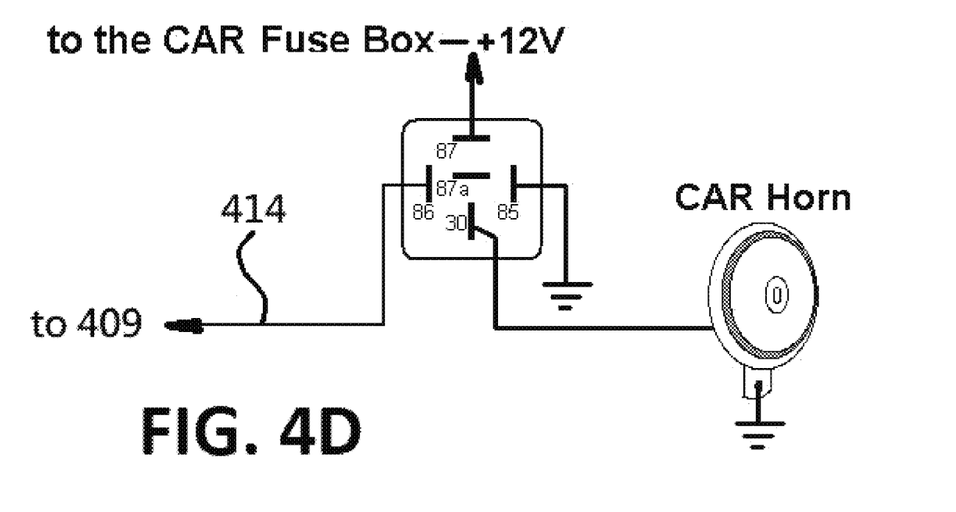
FIG. 4D shows a part of the smart alarm system, in which, a car horn is utilized and connected to the other part of the smart alarm system according to the other aspect of the embodiment of the present invention.

The wire 413 adopted in the connector wire set 409 is electrically grounded, and the wire 414 can be connected to one or both of the following device: a siren and a horn. FIG. 4C shows one aspect of the preferred embodiment of the present disclosure of this invention. The Siren is connected to the wire 414 which receives the output signal from smart sensor module 408 (in FIG. 4B). FIG. 4D shows the other aspect of the preferred embodiment of the present disclosure of this invention. The CAR Horn is connected to the wire 414 which receives the output signal from the smart sensor module 408 (in FIG. 4B). In some other aspects of the embodiment of the disclosure of the present invention, the wire 414 can be electrically coupled to some other device which can audibly or even visually catch the attention of designated person or persons who can see or hear the vehicle.

The switch 420 of the smart sensor 408 is used to start/end the smart sensor module 408, in one aspect of the preferred embodiment of the disclosure to the present invention, the switch 420 is a lightable switch, which is a push switch over a light emitted diode, enabling the light from the LED being visible to people. In some other aspects of the disclosure of the present invention, the switch 420 may utilize other kind of switches which do not emit light when the smart sensor begins to start/end system programming. The adjustable shock sensor 425 of the smart sensor module 408 is used to adjust the threshold value of the adjustable shock sensor 425, if anything makes the vehicle shock or vibrate or shake, i.e., any impact applied the vehicle, to a certain extend exceeds the preset threshold value, the smart sensor 408 will subsequently at least send a signal through wire 414 to make the audio device such as SIREN and/or HORN honk for a period of time, in other words, the vehicle made some sound to draw attention from the people nearby.

Because one of the main features of the disclosure of the application to the present invention is to reduce the total number of the connector wire, thus enabling the workload for the technician. In addition, the other one of the main features of the disclosure is to downsize the dimension of the volume of the physical appearance of the vehicle security device, after the reduction to practice of one embodiment of the present invention, the dimension of the physical appearance of a smart sensor is downsized to 52 mm (mini meter) in length, 50 mm in width, and 18 mm in height, and the smart sensor in this small size according to the embodiment of the application to the present invention can perform many functions like many bulk traditional universal upgraded alarm systems can do. Therefore, there are many places can be utilized to install and hide the smart alarm system inside the cabinet of the vehicle only known to the driver. The greatly downsized smart alarm system has increased the possibility where the driver can choose a place in the cabinet to install the smart sensor module. The place is easily accessible for the person in the cabinet, therefore, also being easily proceed with system programming process, which enabling the smart sensor to learn how many times does the parking light or headlight flashes when it switch from disarm mode to arm mode, and learn how many times does the parking light or headlight flashes when it switch from arm mode to disarm mode. For many traditional vehicle security systems, because the volume is too big and the number of the connecting wires are so many, therefore the available places to install the security system is very limited to the engine bay of the vehicle. Almost all traditional vehicle security system are used to be install in the engine room, and it makes the driver unable to directly access or operate the security system when he was in the cabinet of the vehicle. The above-mentioned shortcomings can easily eliminated if the driver chooses the smart alarm system according to one embodiment of the application to the present invention, and installs the sensor within the cabinet of the vehicle.

Figure 5:
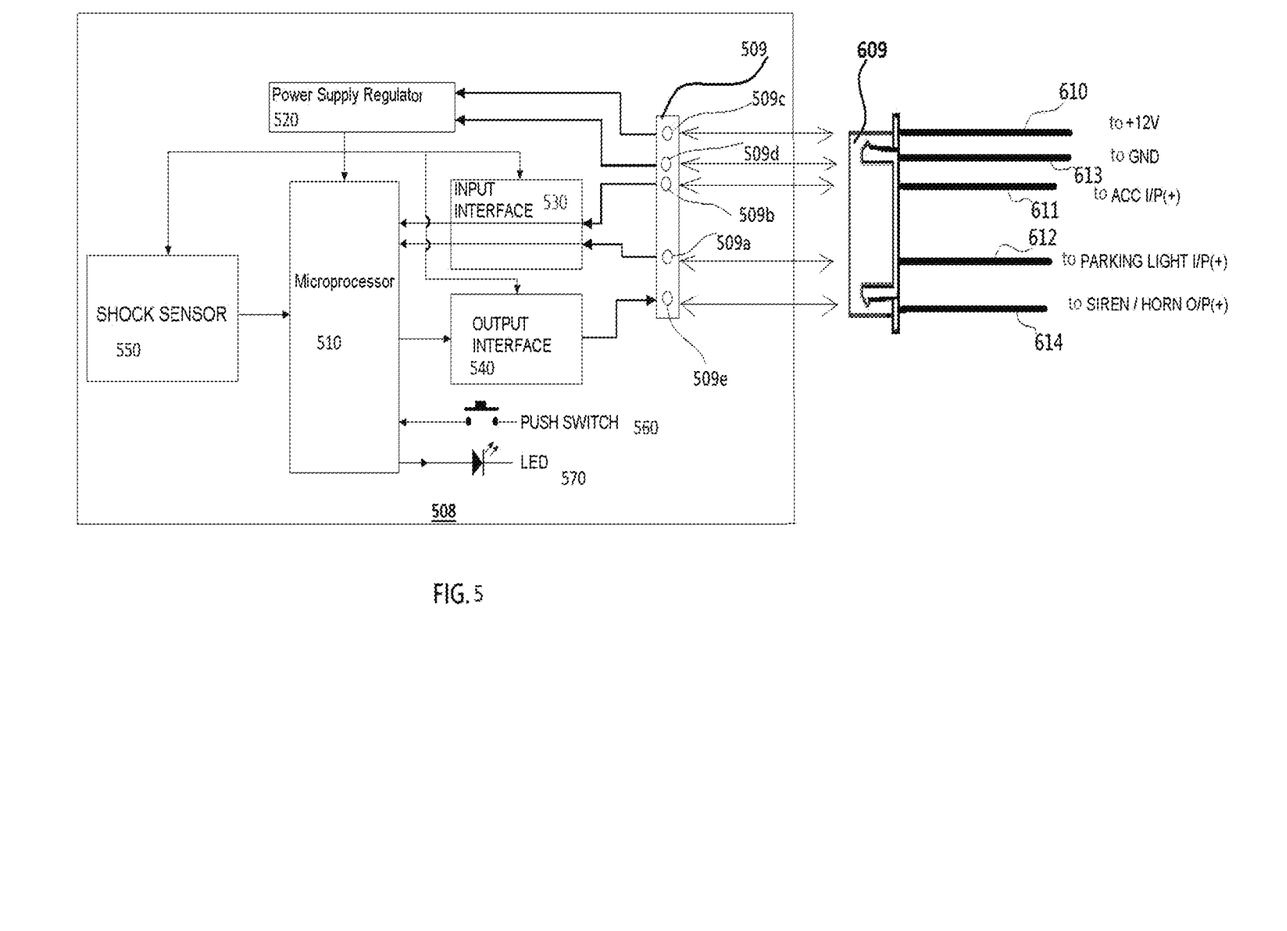
FIG. 5 illustrates the block diagram of a smart sensor module according to one aspect of one embodiment of the present invention, it also illustrates how the smart sensor module is connected to the connecting wires through the connector wire set.

Please refer to FIG. 5, it illustrated the block diagram of a smart sensor module 508 according to one aspect of one embodiment of the present invention, which includes a connector terminal 509, microprocessor 510, power supply regulator 520, an input interface 530, an output interface 540, a shock sensor 550, a push switch 560, and a light emitted diode 570. The connector wire set 609 is used to plug into the connector terminal 509, and each wire adopted in the connector wire set 609 will be electrically coupled to one corresponding pole adopted in the connector terminal 509. In one of the preferred embodiments of the present invention, the shock sensor 550 can use a Piezo Shock sensor, which is adjustable and the user can increase the sensibility to respond better or decrease the sensitivity to response appropriately. The push switch 560 is used to start/end programming the smart sensor module 508, and the status of the light emitted diode 570 is used to show the status of the smart sensor module 508, namely, to show whether the smart alarm system is in arm mode, disarm mode or triggered entering system programming status. If the light emitted diode 570 flashes once for every consecutive second, it represents that the smart alarm system is in the ARM MODE, if the light emitted diode 570 was not lightened, it represents that the smart alarm system is in the DISARM MODE. If the light emitted diode 570 flashes rapidly, it represents that the smart sensor module is being triggered entering system programming, which can be utilized to store the LOCK number and the UNLOCK number into the cue of the microprocessor, the rapidly flashing LED indicates the smart sensor being in this state. Thereafter, the criteria for determining LOCK/UNLOCK is changed to the newly stored LOCK/UNLOCK number, which is referred in this application respectively as LOCK/UNLOCK value.

The power supply regulator 520 regulates the power from wire 610 coupled to +12 volts to an operation voltage for the microprocessor 510, the input interface 530, the output interface 540 and the shock sensor 550, simultaneously, the power supply regulator 520 feed the regulated power to the microprocessor 510, the input interface 530, the output interface 540 and the shock sensor 550 to let them work with operation voltage. If a signal from the wire 611, which was electrically coupled to ACC I/P (+) terminal, or from wire 612, which was electrically coupled to PARKING LIGHT I/P (+) terminal, was sent through input interface 530 to microprocessor 510, or if a signal from shock sensor 550 was sent to the microprocessor 510, subsequently, the microprocessor 510 responsively send a signal to the output interface 540, and then the output interface 540 regulated the signal to the operation voltage to sound the SIREN/HORN to attract the attention from the people nearby the vehicle. Particularly, one of the features of the present disclosure is that the smart sensor module needs only five conductive paths between the smart sensor module and the vehicle, wherein, the five conductive paths consist of each wire adopted in the connector wire set 609 electrically coupling to one corresponding pole adopted in the connector terminal 509. As for the five conductive paths, please refer to FIG. 5, the first pole 509a is coupled through the wire 612 to the positive input terminal of the parking light-PARKING LIGHT I/P (+)-of the vehicle, the second pole 509b is coupled through the wire 611 to the positive end of the input terminal of the ignition switch in the ACC state –ACC I/P (+). The third pole 509c is coupled through the wire 620 to the positive end of the battery, such as +12 volt, and the negative end of the battery, which is ground, is electrically coupled through the wire 613 to the fourth pole 509d of the connector terminal 509. In addition, the fifth pole 509e of the connector terminal is coupled through the wire 614 of the connector wire set 609 to the positive end of the input terminal of SIREN or HORN of the vehicle.

In one aspect of one of the preferred embodiments of the application to the present invention, there are at least three occasions, as mentioned in the paragraph immediately prior to this paragraph that the microprocessor 510 will send a signal through the output interface 540 to sound the SIREN/HORN of the vehicle. The three occasions mentioned above include the following scenarios when the smart sensor being in the ARM status. The first scenario is when the smart sensor module being in the ARM status and an impact occurred to the vehicle, such as a door or the trunk of the vehicle was opened, and the shock exceeds a preset value stored in the shock sensor 550, then a first activating signal is substantially fed to the microprocessor 510, and the microprocessor 510 will send an output-to-alarm signal to the output interface 540, and the voltage was regulated to the operation voltage level of the audio device of the vehicle, such as SIREN or HORN, or even buzzer adapted in the vehicle. The second scenario is when the smart sensor module being in the ARM status and the shock sensor detected that there is shockwave that is associated with a window or a door being broken. The shock sensor quantize the shock wave resulted from the impact occurred to the vehicle. When a shock wave larger than the adjustable preset value is detected, then an first activating signal is substantially fed to the microprocessor 510 from the shock sensor 550, and the microprocessor 510 will accordingly send a output-to-alarm signal to the output interface 540, and the voltage was therefore regulated to the operation voltage level of the audio device of the vehicle, such as SIREN or HORN of the vehicle, and make them honk. The third scenario is when the smart sensor module being in the ARM status and the ignition switch is turned through the "ACC" position reaching the START position trying to crank the engine, at this moment, the wire for providing power to electrical accessories, i.e., the wire coupled to the positive end of the accessory, i.e., ACC I/P (+) terminal, is on a high voltage level, for example, 12 volt, then the input interface 530 feed a second activating signal to the microprocessor 510. In responsive to the second activating signal from the input interface 530, the microprocessor 510 send the output-to-alarm signal to the output interface 540, therefore activating the audio device of the vehicle, i.e., sound the SIREN, HORN or buzzer.

It is well known in the art that many vehicles have adopted automatic starter rather than ignition switch, so the user only hit the starter position briefly, this action or a Jump Start trying to crank the engine, there will be a voltage switching on the positive end of ACC input terminal, i.e., ACC I/P (+) terminal. Therefore, if the aforementioned scenario happened in the vehicle equipped with the smart sensor module according to one embodiment of the present invention, because the voltage switched on the positive end of ACC input terminal at the time when the smart sensor module being in the ARM mode, the audio device, SIREN, HONK or buzzer, is subsequently activated by the output interface 540 responsive to the output-to-alarm signal from the microprocessor 510, which is fed with the second activating signal from the input interface 510.

Although the smart sensor module according to the present invention only has five terminals electrically coupled to corresponding elements of the vehicle through five connecting wires, particularly, the smart alarm system according to the present invention is compatible to the original remote controller from the vehicle's manufacturer, therefore, when performing auto security functions, not any additional remote controller is needed, and still, it can perform several basic features that tradition security system possesses. The basic features mentioned above include: once any of the three occasions happened to the vehicle, the SIREN/HORN of the vehicle will chirp for a certain period like 5 seconds or 45 seconds. When the smart sensor module is in alarm mode, and the ignition switch is turned to "ACC" position, then the siren will sound for 45 seconds. On the other hand, the sensor in one aspect of the preferred embodiment of the application to the present invention is configured as a dual zone shock sensor, which has a response mode divided into two stages: 1. Light Trigger: Warning by siren chirp 5 times. 2. Heavy Trigger: Warning by siren chirp 45 times.

According to the disclosure of the present invention, the technician only has to connect five connecting wires from the smart sensor module to corresponding devices of the vehicle, then the smart alarm system utilizing the smart sensor module can possess the three basic features of vehicle alarm system, wherein the functional block of the smart sensor module is disclosed in FIG. 5, and the operation of the smart sensor module is controlled by a program stored in the microprocessor 510. The flowchart of the aforementioned program is disclosed in FIG. 6, which is only utilized to illustrate how the smart alarm system—with only five connecting wires coupled to corresponding devices of the vehicle's—operates to perform the features of a security system in a vehicle.

Figure 6:
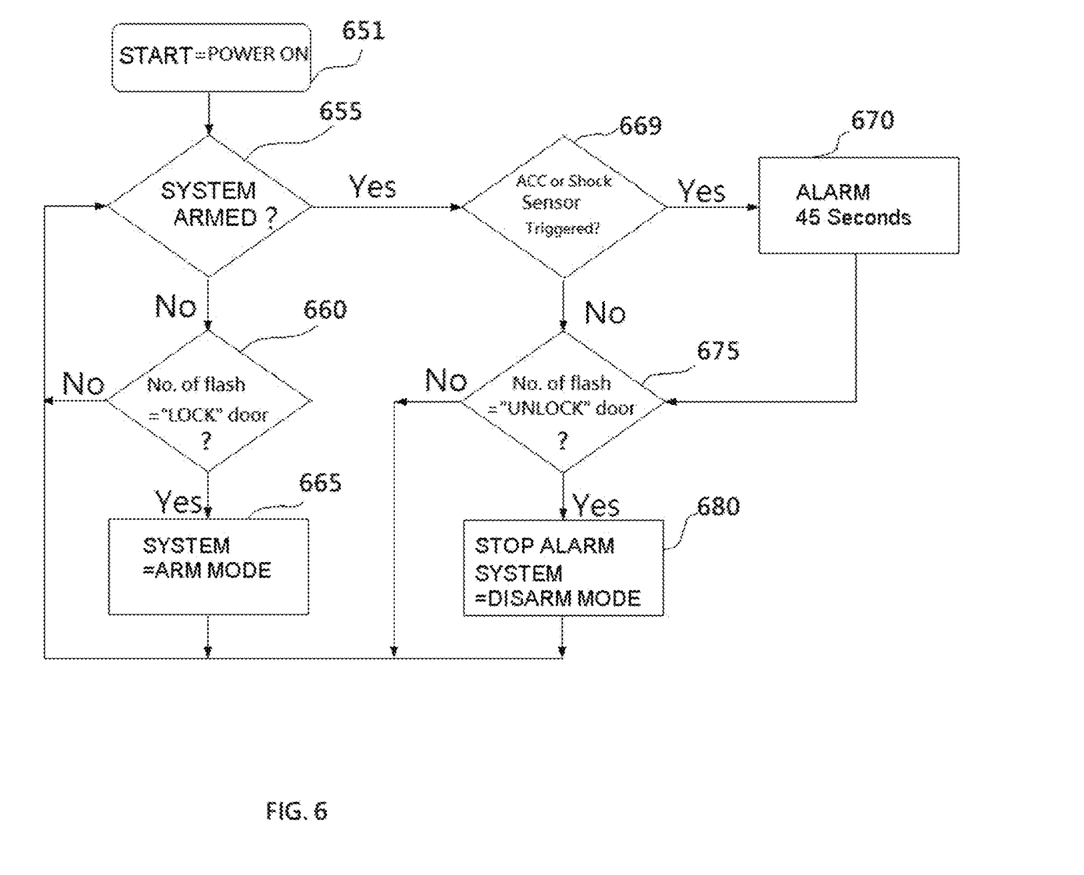
FIG. 6 illustrates the system protection process stored in the microprocessor of the smart sensor module that is used to perform the function as a smart alarm system according to the embodiment of the present invention.

After the smart sensor module according to one aspect of one preferred embodiment of the present invention coupled to the connecting wires, which was coupled to the fuse box 403 of the vehicle, starts a protection process to perform the function as a vehicle alarm system, and the process is depicted in FIG. 6. It is obvious for the person skilled in the art that there can be many different steps can be utilized to achieve the same features as disclosed in the present disclosure, and the steps shown in FIG. 6 is only one example to demonstrate how a certain steps are utilized to complete a couple actions that perform the features of a smart alarm system according to the present invention. The protection process mentioned-above is stored in the microprocessor 510 (as shown in FIG. 5), and it begins from step 651 "START=POWER ON" to start this procedure, then the next step 655 "SYSTEM ARMED ?" is to determine whether the system, i.e., smart sensor module, is armed, if not, then go to step 660 "No. of flash="LOCK" door?", which means determining whether the number of parking light's flash time acquired from wire 612 through the input interface 530 equals to the "LOCK" value stored in the cue of Microprocessor 510, if yes, then go to step 665 "SYSTEM=ARM MODE" to set the status of the smart sensor module as ARMED, then go back to step 655 to determine whether the system is armed.

On the other hand, if the result of step 660 is no, then go back to step 655 "SYSTEM ARMED ?" to check whether the smart sensor module, is armed, if not, then go to step 660 again, if yes, go to step 669 "ACC or Shock Sensor Triggered?" to check, through input interface 530, whether the ACC I/P (+) terminal is on a high voltage level, or whether the shock sensor 550 is triggered. If either one of the aforementioned happened, the Microprocessor 510 substantially send a signal through the output interface 540 and the wire 614 to make the Horn/SIREN 405 chirp, in other words, proceed to step 670 "ALARM 45 seconds", and then go to step 675 "No. of flash="UNLOCK" door?".

If the result of step 669 is no, meaning neither ACC I/P (+) terminal is on a high voltage level, nor the shock sensor 550 is triggered, then the next step after step 669 is step 675 "No. of flash="UNLOCK" door?", which means determining whether the number of parking light's flash time acquired from wire 612 through the input interface 530 equals to the "UNLOCK" value stored in the cue of Microprocessor 530. If the result of step 675 is no, then go back to step 655, determining whether the system is armed or not. On the other hand, if the result of step 675 is yes, then proceed to step 680 "STOP ALARM SYSTEM=DISARM MODE", which means set the smart security module as disarmed mode, in other words, the Microprocessor 510 send a signal through the output interface 540 and the wire 614 to make the Horn/SIREN 405 silent. Then the next step following step 680 is going back to the step 655, determining whether the system is armed or not.

It is believed that the flow chart in FIG. 6 accompanied with the paragraphs mentioned above are sufficient to show that the smart sensor module according to one aspect of the embodiment of the present invention can perform basic features as a security system, however, in comparison with all traditional vehicle security systems, the smart sensor module can automatically determine whether to ARM/DISARM the vehicle, and to perfectly perform many basic features of a vehicle security system which has spared a lot effort on connecting wires that has to be physically connected to many other devices of the vehicle, particularly, all these convenience and resulted efficiency come from only one remote controller from the original manufacturer, namely, use the original remote controller, then the driver can enjoy the convenience of the smart alarm system according to the present invention, not any addition remote controller needed.

As described in all previous paragraphs, when the driver lock/unlock the doors of the vehicle, the pattern of the number of times for headlight flashing and/or the number of times for SIREN/HORN chirping is "LOCK": flash/chirp one time, and "UNLCOK": flash/chirp twice, this parking light flash pattern is almost a worldwide standard for the all vehicles in the market. However, especially in the vehicle market of some European areas or other areas like Asia, Africa, Austria or some very limited areas or rare brands, there might be a couple varieties for the pattern of headlight/ parking-light flash and/or SIREN/HORN chirps times when the vehicle being undergoing LOCK/UNLOCK the doors of the vehicle. To accommodate these varieties, the present invention provides a mechanism for the user to change the parking light flash pattern and siren-chirp pattern for automatically setting the smart security module as ARM/DISARM MODE.

The mechanism mentioned above is a system programming procedure, it is obvious that there can be many procedures utilize many other processes to accomplish the same goal as described in this disclosure, the following is only an example to illustrate one aspect of the embodiment of the application to the present invention. When the user want to change the pattern of headlight-flash and siren-chirp times for automatically setting the smart security module as ARM/DISARM MODE, the user can utilize the smart security module to proceed with a system programming procedure. To enter system programming, the user, at first, turn the ignition key, namely, ignition switch, to ACC position. Secondly, the user presses the Push Switch seven times in ten seconds, subsequently, the user turns the ignition key from ACC position to OFF position. After the entry of system programming, the light emitted diode (in FIG. 5, it is referred as number 70) will continuously blink, then the user can start to press the push switch as many times as the headlight blinks when the vehicle undergoing LOCK/UNLOCK action. Finally, this values will be stored into the cue of the microprocessor as the values utilized to determine whether the user press the LOCK or the UNLOCK button.

For example, if the setting of the vehicle from original manufacturer is that the blink pattern of the driver's vehicle is headlight flashes 10 times after the user press-down the LOCK button on the remote controller, and blinks 2 times after the user press-down the UNLOCK button on the remote controller, according to the embodiment of the present disclosure, the user of the smart sensor module should press the push switch 10 times to input a new number of headlight flash times, it is 10 in this example, and this value will be stored in the microprocessor 510 (FIG. 5) as lock number. Next time, if the driver press LOCK button, then the input interface 530 receives a signal composed of 10 pulses from the connecting wire 612, in other words, the signal switched between voltage high and voltage low ten times. Accordingly, the microprocessor 510 compares the number from the input interface 530 with the default ARM number, in other words, LOCK value, stored in the cue of microprocessor 510, and find that it is a match, as a result, the microprocessor 510 sets the smart sensor module as ARM MODE. With the same manner, the user can subsequently utilize the number of headlight blink times, in this example, it is 2, to store into the cue of microprocessor 510 as the DISARM number, in other words, UNLOCK value, to determine when to set the smart sensor module as DISARM MODE.

From the previous paragraph, it is clear that the smart sensor module according to the present invention can be installed to the any kind of vehicles, even if, when undergoing ARM/DISARM action, the number of headlight blink times are different from that originally stored in the microprocessor of the smart sensor module in the present invention. The only learning procedure to program the setting of LOCK/UNLOCK value, the user only has to follow the steps as described in the previous paragraph. In other words, no matter what headlight flash pattern does a vehicle have, the smart sensor module according to the present invention has provided an operational process for the user to enter system programming, thus enabling the user to replace the originally default flash pattern number (LOCK/UNLOCK values) stored in the cue of the microprocessor with the practical flash pattern number comes with the setting from the vehicle's manufacturer, and making the smart sensor module automatically and correctly ARM/DISARM the smart alarm system when one button of the vehicle's remote controller being pressed-down to LOCK/UNLOCK the vehicle.

As described in the third last paragraph prior to this present paragraph, the user can perform system programming by entering system programming process, which, in the first step turning ignition key to ACC, the second step pressing push button 7 times within 10 seconds, then turning from ACC to OFF. After the user's entry of system programming, the subsequent step is to learn ARM MODE, namely, input the headlight flash ARM number to the microprocessor. In order to reach this goal, after the entry of system programming, the user has to turn the ignition key the first time from OFF position to ON position, then the Siren will chirp once, and then, the user presses the push button 10 times, take the ARM number in the fifth last paragraph prior to this present paragraph as an example. At this time the headlight of the vehicle will flash once, and the siren chirp once. Then the user turn the ignition key from position ON back to position OFF to finish this step. The following step is the second step, which is the second time the user turning the ignition key from position OFF to position ON, and this action will result in the siren chirp twice, and this is the step the user input the headlight flash DISARM number to the microprocessor. In order to reach this goal, after the first step setting headlight flash ARM number, the user has to proceed the second step, turning the ignition key the second time from OFF position to ON position, then the Siren will chirp twice, and then, the user presses the push button 2 times, take the DISARM number in fifth last prior to this present paragragraph as an example. At this time the headlight of the vehicle will flash twice, and the siren will chirp twice. Then the user turn the ignition key from position ON back to position OFF to finish this step. The steps to headlight flash ARM number and DISARM number mentioned above is to show the alarm programmable features according to one aspect of one embodiment of the present invention, which is only an example, and is illustrated in Table 1 for reference.

Figure 7:
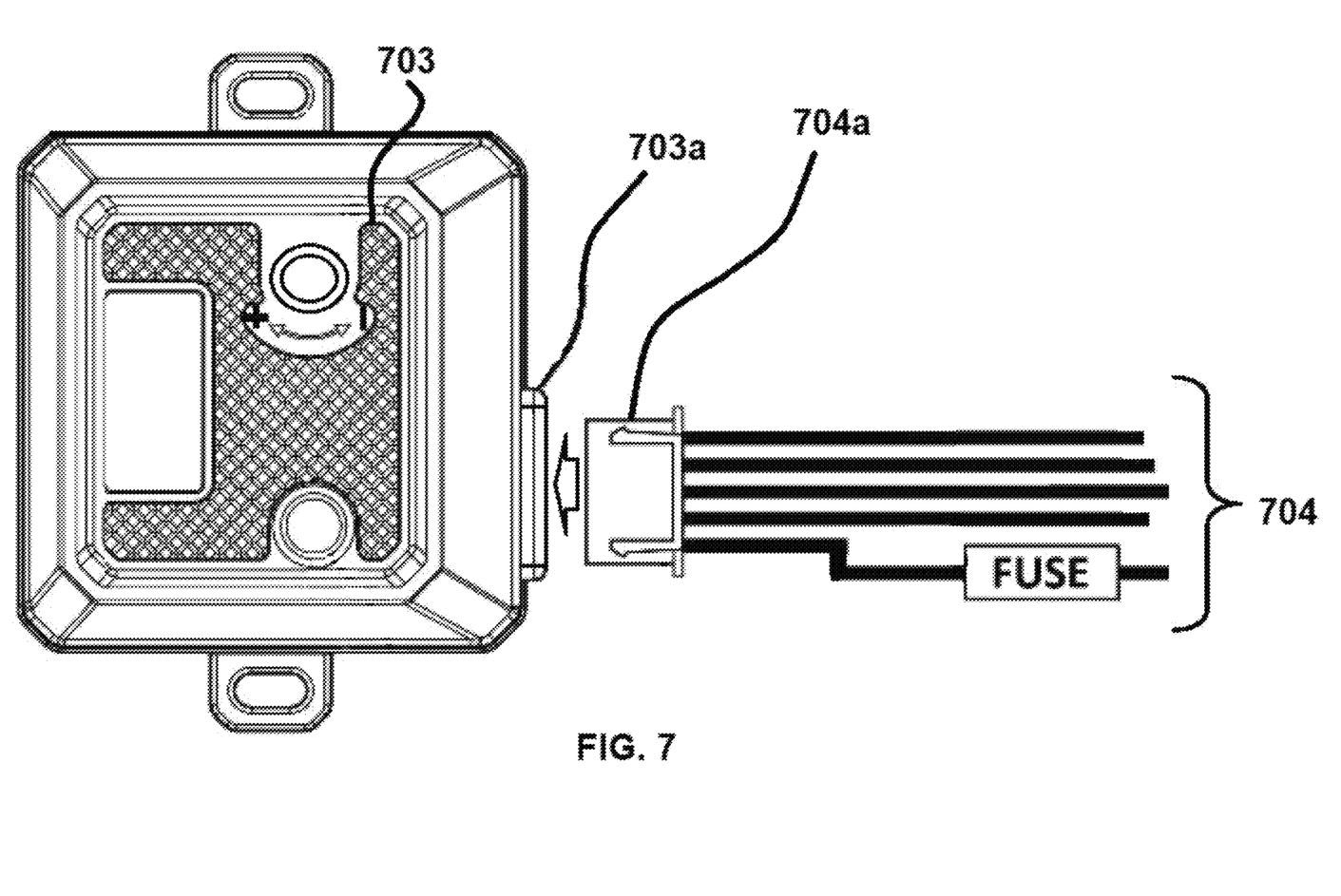
FIG. 7 shows the physical appearance of a smart sensor module and the corresponding wiring set according to one embodiment of the present disclosure.

Please refer to FIG. 7, it is the physical appearance of the smart sensor module according to one embodiment of the present disclosure to the present invention, which includes a smart sensor module 703 and a wiring set 704, the connector terminal 703a of the smart sensor module 703 is designed to connect to the connector head 704a of the wiring set 704. It is noticed that, when installing the smart sensor module to the vehicle, the number of wires of the wiring set 704 is five, it greatly reduced the workload of a technician

TABLE 1

| No. | Function | Ignition OFF to ON $1^{st}$ time Siren chirp once | Ignition OFF to ON $2^{nd}$ time Siren chirp twice | |
|---|---|---|---|---|
| 1. | Learning mode | Learning ARM Mode (DF = 1 flash) | Learning DISARM Mode (DF = 2 flashs) | Siren chirp once |
| 2. | Siren/Horn | Horn | Siren (DF) | Siren chirp once |

It is understood that the above descriptions of embodiments are given by way of example only and that various modifications may be made by those with ordinary skill in the art. The above specification, examples and data provide a complete description of the structure and use of exemplary embodiments of the invention. Although various embodiments of the invention have been described above with a certain degree of particularity, or with reference to one or more individual embodiments, those with ordinary skill in the art could make numerous alterations to the disclosed embodiments without departing from the spirit or scope of this invention.

What is claimed is:

1. A smart sensor module having an arm mode and a disarm mode respectively settable in response to a press-down on a lock button and the other press-down on an unlock button of a remote controller paired to a vehicle, said vehicle including a battery, a connector wire set, a fuse box, an audio device and an ignition switch having an on state, an ACC state and an off state, said fuse box having four fuses, a first fuse of said fuse box being electrically coupled to positive end of an exterior lighting device of said vehicle, said smart sensor module comprising:
    a connector terminal adapted to provide five conductive paths from said fuse box and said audio device of said vehicle into each corresponding devices of said smart sensor module, wherein the number of conductive paths electrically coupling said smart sensor module and said vehicle does not exceed five;
    a power supply regulator for regulating and feeding power to each devices of said smart sensor module, said power supply regulator being electrically coupled through said connector terminal to said fuse box;
    an input interface adapted to convert and transmit voltage level on said ignition switch and said positive end of said exterior lighting device to a range within rated input voltage of element electrically coupled to said input interface,
    a microprocessor adapted to arm said smart sensor module in response to said press-down on said lock button resulting in number of voltage-switching times on said positive end of said exterior lighting device equals to a lock value stored in said microprocessor, said microprocessor responsively setting said smart sensor module as disarm mode when said press-down on said unlock button resulting in number of voltage-switching times on said positive end of said exterior lighting device equals to an unlock value stored in said microprocessor, wherein a protection process and a system programming process being stored in said microprocessor, said system programming process providing a mechanism to reset said lock value and said unlock value;
    a shock sensor adapted to quantize shock wave resulted from an impact occurred to said vehicle and to feed a first activating signal to said microprocessor when said quantized value exceeds an adjustable preset value; and
an output interface adapted to sound said audio device in response to output signal from said microprocessor, wherein since said smart sensor module has been set as said arm mode, said microprocessor performs said protection process to detect whether voltage level on a positive end of said ignition switch in said ACC state being switched or said shock sensor being triggered by any impact exceeding said adjustable preset value, if at least one result of the detection by the protection process is positive, then the protection process in the microprocessor's output signal sounds said audio device for a preset time period through one of the five conductive paths of said connector terminal, wherein the other four conductive paths of said connector terminal are coupled to said four fuses of said fuse box.

2. The smart sensor module as claim 1, wherein said connector wire set consists of five connecting wires, a first connecting wire of said connector wire set electrically coupling said positive end of said exterior lighting device through said first fuse to a first pole of said connector terminal and said input interface, a second connecting wire of said connector wire set electrically coupling said positive end of said ignition switch in said ACC state through a second fuse to a second pole of said connector terminal and said input interface, a third connecting wire of said connecting wire set electrically coupling a positive output pole of said battery through a third fuse to a third pole of said connector terminal to said power supply regulator, a fourth connecting wire of said connecting wire set electrically coupling a ground output pole of said battery through a fourth fuse to a fourth pole of said connector terminal to said power supply regulator, a fifth connecting wire of said connecting wire set electrically coupling a positive terminal of said audio device through a fifth pole of said connector terminal to said output interface.

3. The smart sensor module as claim 1, wherein said audio device is selected from the group consisting of: car horn, siren, buzzer, and combinations thereof.

4. The smart sensor module as claim 1, wherein said exterior lighting device is selected from the group consisting of: light bulb, light emitted diodes, and combinations thereof.

5. The smart sensor module as claim 1, wherein said protection process comprising the steps of:
    a first step, determining if said smart sensor module being set as arm mode, if not, then determining if said number of voltage-switching times on said positive end of said exterior lighting device equals to said lock value, if not, go to said first step, if yes, set said smart sensor module as arm mode and go to said first step,
    if said smart sensor module not being set as arm mode, then determine if either of the following occurred: said impact occurred to said vehicle and voltage level on said positive end of said ignition switch in said ACC state being switched, if yes, sound said audio device for said preset time period and then go to next step, if not, go to said next step:
    determining if said number of voltage-switching times on said positive end of said exterior lighting device equal to said unlock value, if not, go to said first step, if yes, set said smart sensor module in said unarm mode and then go to said first step.

6. The smart sensor module as claim 1 further comprising a push switch for activating said system programming process stored in said microprocessor, wherein said vehicle comes with a default arm number and a default disarm number respectively different from said lock value and said unlock value originally stored in said microprocessor, then said system programming process can be utilized to store said default arm number and said default disarm number into said microprocessor to replace said lock value and said unlock value respectively.

7. The smart sensor module as claim 6, wherein said system programming process comprising the steps of:
    turning said ignition switch to said ACC state,
    pressing said push switch a first preset number of times in a first preset time period;

turning said ignition switch from said ACC state to said off state;

pressing said push switch as many times as default arm number comes with said vehicle, wherein said default arm number is stored as said LOCK value in said microprocessor;

turning said ignition switch to said ACC state, pressing said push switch a second preset number of times in a second preset time period;

turning said ignition switch from said ACC state to said off state; and pressing said push switch as many times as default disarm number comes with said vehicle, wherein said default disarm number is stored as said UNLOCK value in said microprocessor.

8. The smart sensor module as claim 1 further comprising a light emitted diode for indicating whether said smart sensor module being in said arm mode, said disarm mode, or said system programming process being performing by said microprocessor.

9. The smart sensor module as claim 1 further comprising a light emitted diode for indicating whether said smart sensor module being in said arm mode, said disarm mode, or said system programming process being performing by said microprocessor.

10. A smart sensor module having an arm mode and a disarm mode respectively settable in response to a press-down on a lock button and the other press-down on an unlock button of a remote controller paired to a vehicle, said vehicle including a battery, a connector wire set, a fuse box, an audio device and an ignition switch having an on state, an ACC state and an off state, said fuse box having four fuses, a first fuse of said fuse box being electrically coupled to positive end of an exterior lighting device of said vehicle, said smart sensor module consisting essential of:

a connector terminal adapted to provide five conductive paths from said fuse box and said audio device of said vehicle into each corresponding devices of said smart sensor module, wherein the number of conductive paths electrically coupling said smart sensor module and said vehicle does not exceed five;

a power supply regulator for regulating and feeding power to each devices of said smart sensor module, said power supply regulator being electrically coupled through said connector terminal to said fuse box;

an input interface adapted to convert and transmit voltage level on said ignition switch and said positive end of said exterior lighting device to a range within rated input voltage of element electrically coupled to said input interface, a microprocessor adapted to arm said smart sensor module in response to said press-down on said lock button resulting in number of voltage-switching times on said positive end of said exterior lighting device equals to a lock value stored in said microprocessor, said microprocessor responsively setting said smart sensor module as disarm mode when said press-down on said unlock button resulting in number of voltage-switching times on said positive end of said exterior lighting device equals to an unlock value stored in said microprocessor, wherein a protection process and a system programming process being stored in said microprocessor, said system programming process providing a mechanism to reset said lock value and said unlock value;

a shock sensor adapted to quantize shock wave resulted from an impact occurred to said vehicle and to feed a first activating signal to said microprocessor when said quantized value exceeds an adjustable preset value; and an output interface adapted to sound said audio device in response to output signal from said microprocessor, wherein since said smart sensor module has been set as said arm mode, said microprocessor performs said protection process to detect whether voltage level on a positive end of said ignition switch in said ACC state being switched or said shock sensor being triggered by any impact exceeding said adjustable preset value, if at least one result of the detection by the protection process is positive, then the protection process in the microprocessor's output signal sounds said audio device for a preset time period through one of the five conductive paths of said connector terminal, wherein the other four conductive paths of said connector terminal are coupled to said four fuses of said fuse box.

11. The smart sensor module as claim 10, wherein said connector wire set consists of five connecting wires, a first connecting wire of said connector wire set electrically coupling said positive end of said exterior lighting device through said first fuse to a first pole of said connector terminal and said input interface, a second connecting wire of said connector wire set electrically coupling said positive end of said ignition switch in said ACC state through a second fuse to a second pole of said connector terminal and said input interface, a third connecting wire of said connecting wire set electrically coupling a positive output pole of said battery through a third fuse to a third pole of said connector terminal to said power supply regulator, a fourth connecting wire of said connecting wire set electrically coupling a ground output pole of said battery through a fourth fuse to a fourth pole of said connector terminal to said power supply regulator, a fifth connecting wire of said connecting wire set electrically coupling a positive terminal of said audio device through a fifth pole of said connector terminal to said output interface.

12. The smart sensor module as claim 10, wherein said audio device is selected from the group consisting of: car horn, siren, buzzer, and combinations thereof.

13. The smart sensor module as claim 10, wherein said exterior lighting device is selected from the group consisting of: light bulb, light emitted diodes, and combinations thereof.

14. The smart sensor module as claim 10, wherein said protection process comprising the steps of:

a first step, determining if said smart sensor module being set as arm mode, if not, then determining if said number of voltage-switching times on said positive end of said exterior lighting device equals to said lock value, if not, go to said first step, if yes, set said smart sensor module as arm mode and go to said first step, if said smart sensor module not being set as arm mode, then determine if either of the following occurred: said impact occurred to said vehicle and voltage level on said positive end of said ignition switch in said ACC state being switched, if yes, sound said audio device for said preset time period and then go to next step, if not, go to said next step:

determining if said number of voltage-switching times on said positive end of said exterior lighting device equal to said unlock value, if not, go to said first step, if yes, set said smart sensor module in said unarm mode and then go to said first step.

15. The smart sensor module as claim 10 further comprising a push switch for activating said system programming process stored in said microprocessor, wherein said vehicle comes with a default arm number and a default disarm number respectively different from said lock value and said unlock value originally stored in said microprocessor, then said system programming process can be utilized to store said default arm number and said default disarm number into said microprocessor to replace said lock value and said unlock value respectively.

16. The smart sensor module as claim 15, wherein said system programming process comprising the steps of:
- turning said ignition switch to said ACC state,
- pressing said push switch a first preset number of times in a first preset time period;
- turning said ignition switch from said ACC state to said off state;
- pressing said push switch as many times as default arm number comes with said vehicle, wherein said default arm number is stored as said LOCK value in said microprocessor;
- turning said ignition switch to said ACC state,
- pressing said push switch a second preset number of times in a second preset time period;
- turning said ignition switch from said ACC state to said off state; and
- pressing said push switch as many times as default disarm number comes with said vehicle, wherein said default disarm number is stored as said UNLOCK value in said microprocessor.

* * * * *